US012762510B2

(12) United States Patent
Nakazawa

(10) Patent No.: US 12,762,510 B2
(45) Date of Patent: Oct. 13, 2026

(54) MANAGEMENT APPARATUS AND MANAGEMENT METHOD

(71) Applicant: SYNCA-OUTFIT NQ CO.,LTD, Tokyo (JP)

(72) Inventor: Hideta Nakazawa, Tokyo (JP)

(73) Assignee: SYNCA GROUP, LTD., Tokyo (JP)

( * ) Notice: Subject to any disclaimer, the term of this patent is extended or adjusted under 35 U.S.C. 154(b) by 971 days.

(21) Appl. No.: 17/827,873

(22) Filed: May 30, 2022

(65) Prior Publication Data

US 2022/0318736 A1 Oct. 6, 2022

Related U.S. Application Data

(63) Continuation of application No. PCT/JP2021/014641, filed on Apr. 6, 2021.

(51) Int. Cl.
*G06Q 10/087* (2023.01)
*G06V 20/52* (2022.01)

(52) U.S. Cl.
CPC ........... *G06Q 10/087* (2013.01); *G06V 20/52* (2022.01)

(58) Field of Classification Search
CPC ....... G06Q 10/087; G06Q 30/06; G06V 20/52
See application file for complete search history.

(56) References Cited

U.S. PATENT DOCUMENTS

| | | | | |
|---|---|---|---|---|
| 2014/0100999 | A1* | 4/2014 | Mountz | G06Q 10/087 705/28 |
| 2020/0074432 | A1* | 3/2020 | Valdman | G07G 5/00 |
| 2021/0056505 | A1* | 2/2021 | Tiwari | B25J 9/1697 |
| 2021/0082031 | A1* | 3/2021 | Liu | G06Q 10/08 |
| 2021/0124937 | A1* | 4/2021 | Mirza | G06T 7/292 |
| 2021/0409648 | A1* | 12/2021 | Kallakuri | G06T 7/70 |

* cited by examiner

*Primary Examiner* — Andrew W Bee
*Assistant Examiner* — D J Dhooge
(74) *Attorney, Agent, or Firm* — Alley IP

(57) ABSTRACT

A control unit divides a predetermined space (a shop in the embodiment discussed herein) into units previously set in unit three-dimensional virtual cube master data to set relative position coordinates (unit three-dimensional virtual cubes), issues numbers (unit three-dimensional virtual cube sequence numbers) identifying the position coordinates, and creates a stock information management table T2 that associates the position coordinates ((shop)VM(1)SNg), the identification information (item sequence number) of an item existing at the position coordinates, and the presence or absence (delivery flag) of movement of the item with each other.

14 Claims, 16 Drawing Sheets

51 UNIT THREE-DIMENSIONAL VIRTUAL CUBE MASTER DATA

| (shop)VM(1)SNg | SIZE (n) | SIZE UNIT | VIRTUAL SPACE POSITION COORDINATES (LENGTH, WIDTH, HEIGHT) |
|---|---|---|---|
| A0001 | 1 | $mm^3$ | 10,10,0 |
| A0002 | 1 | $mm^3$ | 11,10,0 |
| A0003 | 1 | $mm^3$ | 12,10,0 |
| A0004 | 1 | $mm^3$ | 13,10,0 |
| A0005 | 1 | $mm^3$ | 14,10,0 |
| A0006 | 1 | $mm^3$ | 10,11,0 |
| A0007 | 1 | $mm^3$ | 11,11,0 |
| A0008 | 1 | $mm^3$ | 12,11,0 |
| A0009 | 1 | $mm^3$ | 13,11,0 |
| A0010 | 1 | $mm^3$ | 14,11,0 |
| ... | ... | ... | ... |

FIG. 4

52 ITEM MASTER DATA

| ITEM CODE | ITEM NAME | PACKAGE FLAG | ITEM SIZE | SIZE UNIT | PACK CODE |
|---|---|---|---|---|---|
| 0001 | PRODUCT A | 1 | 10,10,10 | $cm^3$ | D |
| 0002 | APPLE | 0 | 5,5,5 | $cm^3$ | – |
| 0003 | PEAR | 0 | 5,5,5 | $cm^3$ | – |

FIG. 5

53 PACK MASTER DATA

| PACK CODE | PACK NAME | PER-PACK QUANTITY |
|---|---|---|
| D | DOZEN | 12 |
| C | CASE | 24 |
| ... | ... | ... |

FIG. 6

54 SHOPPING BASKET MASTER DATA

| SHOPPING BASKET NUMBER | SHOPPING BASKET NAME |
|---|---|
| K0001 | BASKET 1 |
| K0002 | BASKET 2 |
| ... | ... |

FIG. 7

T1 WAREHOUSING INFORMATION MANAGEMENT TABLE

| ITEM SEQUENCE NUMBER | ITEM CODE | WAREHOUSING GROUP NUMBER | ITEM SIZE | QUANTITY | WAREHOUSING DATE |
|---|---|---|---|---|---|
| G(product)SNg1 | 0001 | 1 | 10,10,10 | 1 | 2021/2/15 |
| G(apple)SNg1 | 0002 | 1 | 5,5,5 | 1 | 2021/2/15 |
| G(apple)SNg2 | 0002 | 1 | 5,5,5 | 1 | 2021/2/15 |
| G(pear)SNg1 | 0003 | 1 | 5,5,5 | 1 | 2021/2/15 |
| G(pear)SNg2 | 0003 | 1 | 5,5,5 | 1 | 2021/2/15 |

FIG. 8

T1a

WAREHOUSING INFORMATION MANAGEMENT TABLE

| ITEM SEQUENCE NUMBER | ITEM CODE | WAREHOUSING GROUP NUMBER | ITEM SIZE | QUANTITY | WARE-HOUSING DATE | VWP SEQUENCE NUMBER |
|---|---|---|---|---|---|---|
| G(product)SNg1 | 0001 | 1 | 10,10,10 | 1 | 2021/2/15 | VWP1 |
| G(apple)SNg1 | 0002 | 1 | 5,5,5 | 1 | 2021/2/15 | VWP2 |
| G(apple)SNg2 | 0002 | 1 | 5,5,5 | 1 | 2021/2/15 | VWP3 |
| G(pear)SNg1 | 0003 | 1 | 5,5,5 | 1 | 2021/2/15 | VWP4 |
| G(pear)SNg2 | 0003 | 1 | 5,5,5 | 1 | 2021/2/15 | VWP5 |

FIG. 9

T2 STOCK INFORMATION MANAGEMENT TABLE

| STOCK SEQUENCE NUMBER | ITEM SEQUENCE NUMBER | ITEM CODE | (shop)VM(1)SNg | WARE-HOUSING DATE | PACK CODE | VWP SEQUENCE | DELIVERY DATE | DELIVERY FLAG |
|---|---|---|---|---|---|---|---|---|
| G(product)VWP1SNg1 | G(product)SNg1 | 0001 | A0001,A0002,・・・ | 2021/2/15 | D | VWP1 | | 0 |
| G(apple)VWP2SNg1 | G(apple)SNg1 | 0002 | A1001,A1002,・・・ | 2021/2/15 | | VWP2 | | 0 |
| G(apple)VWP3SNg2 | G(apple)SNg2 | 0002 | A2001,A2002,・・・ | 2021/2/15 | | VWP3 | | 0 |
| G(pear)VWP4SNg1 | G(pear)SNg1 | 0003 | A3001,A3002,・・・ | 2021/2/15 | | VWP4 | | 0 |
| G(pear)VWP5SNg2 | G(pear)SNg2 | 0003 | A4001,A4002,・・・ | 2021/2/15 | | VWP5 | | 0 |

FIG. 10

T3 DISPLAY PLACE MANAGEMENT TABLE

| DISPLAY PLACE SEQUENCE NUMBER | DISPLAY PLACE TYPE | (shop)VM(1)SNg | DISPLAY TYPE SIZE |
|---|---|---|---|
| L0001 | SHELF | A0001,A0002,··· | 300,300,300 |
| L0002 | FLOOR | A1001,A1002,··· | 50,50,1 |
| L0003 | STORAGE CASE | A2001,A2002,··· | 1000,800,2500 |

FIG. 11

T4 VISITOR INFORMATION MANAGEMENT TABLE

| VISITOR SEQUENCE NUMBER | IDENTIFICATION CLASSIFICATION | VISITOR IDENTIFICATION INFORMATION | ENTRY DATE AND TIME | SHOPPING BASKET NUMBER | EXIT DATE AND TIME |
|---|---|---|---|---|---|
| T0001 | IC CARD | ··· | 2021/02/16 9:00:00 | K0001 | |
| T0002 | MOBILE TERMINAL | ··· | 2021/02/16 10:00:00 | K0002 | |

FIG. 12

T5 TAKE-OUT INFORMATION MANAGEMENT TABLE

| VISITOR SEQUENCE NUMBER | STOCK SEQUENCE NUMBER | PROCESSING FLAG |
|---|---|---|
| T0001 | G(apple)VWP2SNg1 | 0 |
| T0001 | G(apple)VWP3SNg2 | 0 |
| T0001 | G(pear)VWP4SNg1 | 0 |
| T0002 | G(pear)VWP5SNg2 | 0 |
| T0002 | G(product)VWP1SNg1 | 0 |

FIG. 13

T2a STOCK INFORMATION MANAGEMENT TABLE

| STOCK SEQUENCE NUMBER | ITEM SEQUENCE NUMBER | ITEM CODE | (shop)VM(1)SNg | WARE-HOUSING DATE | PACK CODE | VWP SEQUENCE NUMBER | DELIVERY DATE | DELIVERY FLAG |
|---|---|---|---|---|---|---|---|---|
| G(product)VWP1SNg1 | G(product)SNg1 | 0001 | A0001,A0002,・・・ | 2021/2/15 | D | VWP1 | 2021/02/16 | 1 |
| G(apple)VWP2SNg1 | G(apple)SNg1 | 0002 | A1001,A1002,・・・ | 2021/2/15 | | VWP2 | 2021/02/16 | 1 |
| G(apple)VWP3SNg2 | G(apple)SNg2 | 0002 | A2001,A2002,・・・ | 2021/2/15 | | VWP3 | 2021/02/16 | 1 |
| G(pear)VWP4SNg1 | G(pear)SNg1 | 0003 | A3001,A3002,・・・ | 2021/2/15 | | VWP4 | 2021/02/16 | 1 |
| G(pear)VWP5SNg2 | G(PEAR)SNg2 | 0003 | A4001,A4002,・・・ | 2021/2/15 | | VWP5 | 2021/02/16 | 1 |

FIG. 14

MANAGEMENT APPARATUS AND MANAGEMENT METHOD

RELATED APPLICATIONS

This application claims the benefit under 35 U.S.C. § 120, and is a continuation, of co-pending International Application PCT/JP2021/014641, filed Apr. 6, 2021 and designating the US. This International Application is incorporated by reference herein in its entirety.

FIELD

The embodiment discussed herein relates to a management apparatus and a management method.

BACKGROUND

A system for managing stocks of items has been known. For example, there have been known a system in which a position measurement system and a position measurement server automatically measure a position where a package is warehoused by a manned guided vehicle in a flat warehouse and a stock management system converts an absolute physical position that is the measured position of the package into a relative logical position that is a relative arrangement of the package and manages the package as a stock using the relative logical position.

Please see, for example, Japanese Laid-open Patent Publication No. 2002-87530.

Japanese Laid-open Patent Publication No. 2002-87530 states "measuring the absolute physical position of a package warehoused as the position of the package, converting the absolute physical position into a relative logical position, and performing stock management," but does not disclose any specific method therefor.

SUMMARY

According to one aspect, there is provided a management apparatus including: a processor configured to perform a procedure including assigning unique sequence numbers respectively to objects existing in a predetermined real space, setting relative position coordinates for each unit space of a virtual space formed by dividing the real space by preset units, issuing numbers identifying the position coordinates, and based on information obtained by capturing an image of an individual object arranged in the real space, determining a number identifying position coordinates indicating a place of the individual object in the virtual space, dividing a size of an object existing in the virtual space by the preset units, and registering first information linking range information of position coordinates the object occupies and a sequence number of the object to each other, registering second information indicating whether a process of permitting movement of the object out of the virtual space has been performed, and updating, upon detecting that the process of permitting the movement of the object has been performed, the second information corresponding to the sequence number of the object so as to indicate that the process of permitting the movement of the object has been performed; and a memory coupled to the processor and configured to hold the first information and the second information.

BRIEF DESCRIPTION OF THE DRAWINGS

FIG. 4 is a view for describing unit three-dimensional virtual cube master data;

FIG. 5 is a view for describing item master data;

FIG. 6 is a view for describing pack master data;

FIG. 7 is a view for describing shopping basket master data;

FIG. 8 is a view for describing a warehousing information management table;

FIG. 9 is a view for describing an updated warehousing information management table;

FIG. 10 is a view for describing a stock information management table;

FIG. 11 is a view for describing a display place management table;

FIG. 12 is a view for describing a visitor information management table;

FIG. 13 is a view for describing a take-out information management table;

FIG. 14 is a view for describing an updated stock information management table;

DETAILED DESCRIPTION

Figure 1:
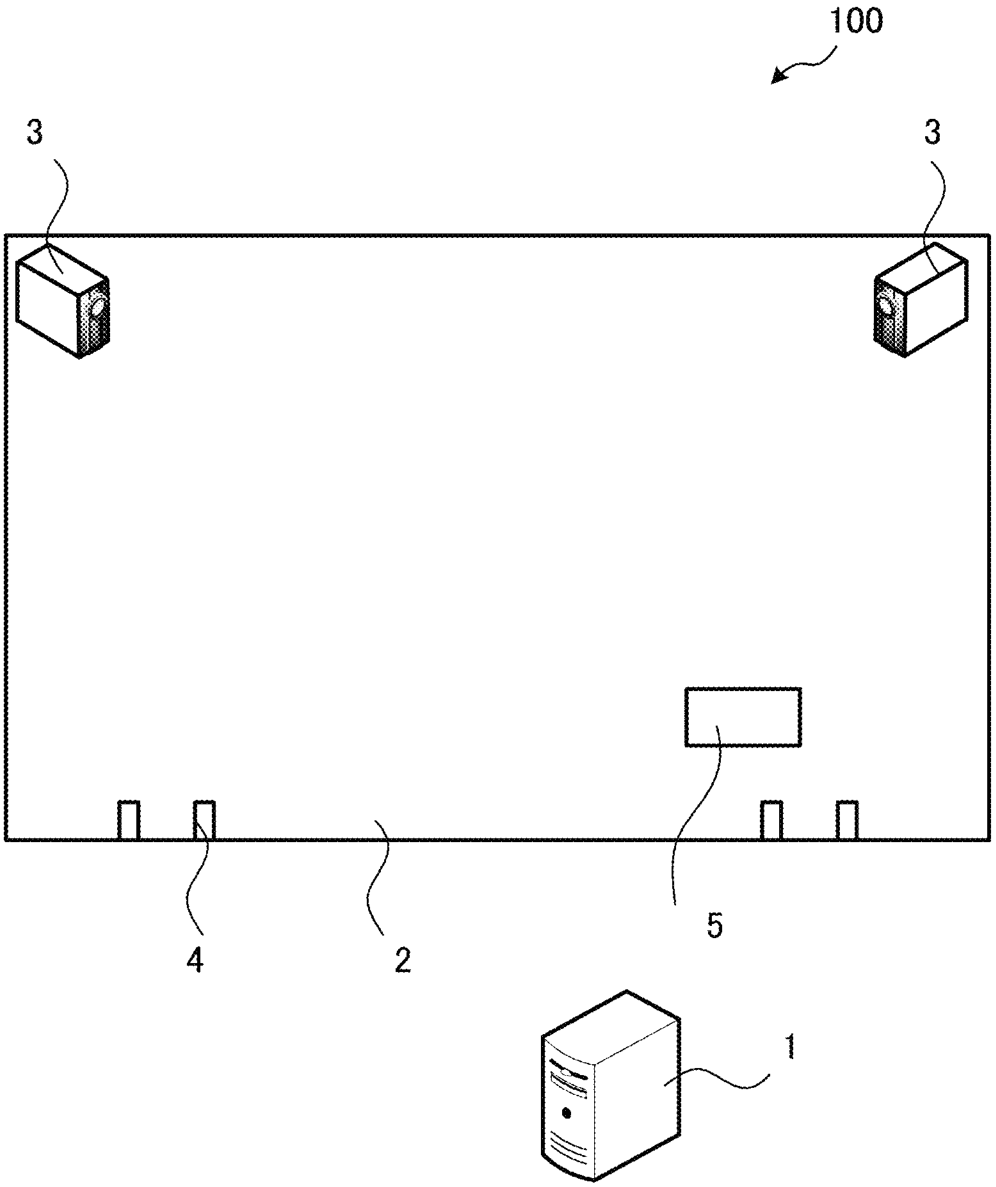
FIG. 1 is a view for describing a management system according to one embodiment.

Hereinafter, a management apparatus according to one embodiment will be described in detail with reference to the accompanying drawings.

For easy understanding of the embodiment, the positions, sizes, shapes, ranges, and others of the individual components illustrated in the drawings do not represent the actual positions, sizes, shapes, ranges, and others. Therefore, the embodiment is not limited to the illustrated positions, sizes, shapes, ranges, and others.

Elements that are each expressed in a singular form in the embodiment may be plural in use, expect otherwise particularly specified in writing.

In addition, the term "sigma" is used to represent the summation symbol L in the following description.

Embodiment

A management apparatus (computer) of one embodiment divides a three-dimensional (a·b·c) $m^3$ real space (hereinafter, referred to as "RLS(α)") into cubes that are each a three-dimensional virtual space of (n) $mm^3$ (hereinafter, referred to as "(α)VM(n)."

In this connection, the symbol "α" is not a variable but is used to specify a real space. For example, "α=earth" means that the earth is divided into cubes in a virtual space. As another example, "α=warehouse" means that a warehouse is divided into cubes in a virtual space.

Unit three-dimensional virtual spaces (α)VM(n) each assigned a sequence (SQ) number (this numbering is hereinafter referred to "SNg") are individually referred to as (α)VM(n)SNg(k), where k is a positive number.

Assume that the length (α), width (b), and height (c) are measured in units of meter (m), just for convenience. Assuming that a=b=c=1 m and (n)=1, RLS(α)/(α)VM(n)=1 $m^3/1\ mm^3=10^6$.

That is, the number of SQ numbers used for performing SNg on 1 $mm^3$ unit three-dimensional virtual spaces obtained from a 1 $m^3$ real space RLS(α) is defined as sigmaSNg(k). More specifically, sigmaSNg(1,000,000)=1,000,000 is obtained.

For (α)VM(n)SNg(k)T obtained by further adding a real time (t), the following (i), (ii), and (iii) are satisfied.

(i) The number of sequence numbers to be assigned to (α)VM(n) obtained from (a·b·c)RLS(α) is sigma(α)VM(n)SNg(k), where k is a positive number.

(ii) When t=0, sigma(α)VM(n)SNg(k)=sigma(α)VM(n)SNg(k)T represents a static virtual space.

(iii) when t≠0, sigma(α)VM(n)SNg(k)=sigma(α)VM(n)SNg(k)T represents a dynamic virtual space. (rotational movement in the case where a is the earth)

Note that the number of sequence numbers, i.e., sigmaSNg(k) is the same in both cases.

The (n) value is desirably determined, depending on the sizes of entities existing in RLS(α).

When RLS(α) approaches to infinity, a is considered to be an outer space. When RLS(α) approaches to zero, a is considered to be an atomic space.

For example, assuming that (n)=1, a real sphere space with a radius of 30,000 km from the center of the earth may be defined as RLS(earth), or a real cube space that has a length of 60,000 km on each side to enclose the earth may be defined as RLS(earth).

When SNg is performed on (earth)VM(1) obtained from RLS(earth), the sum of (earth)VM(1)SNg for all entities inside and on the earth and all spaces including the atmosphere of the earth and the exosphere outside the atmosphere is represented by sigma(earth)VM(1)SNg(k) (k is a positive number).

By defining RLS(earth) as an absolute space, all entities including buried entities under the ground of the earth, and natural entities including animals and plants and artificial entities on the earth are each assigned a sequence number with sigma(earth)VM(1)SNg(k).

The following describes the case where sequence numbers are assigned for the real space of a supermarket (shop) where we make shopping.

In the case where (n) is set to one and a is set to shop, RLS(shop)=sigma(shop)VM(1)SNg(k) is satisfied from the above (i).

By the way, a shop is one of entities on the earth, and therefore a collection of sigma(shop)VM(1) is part of a collection of sigma(earth)VM(1). That is, sigma(shop)VM(1)SNg(k) e sigma(earth)VM(1)SNg(k) is satisfied, where t=0.

Now, the existential conditions of items (hereinafter, referred to as "G(β)") for managing the items as stocks in the shop will be considered.

An item G(β) is a three-dimensional object packed by paper, glass, vinyl, or another, irrespective of whether the content of the item is solid or liquid.

Assume that one G(β) is scanned by a 3D scanner (hereinafter, referred to as "3DSg") and the obtained image is wrapped with a very thin virtual wrapping sheet (hereinafter, referred to as "G(β)VWP"). Here, G(β)VWP assigned a sequence number is referred to as G(β)VWPSNg(k).

By spreading G(β)VWP assigned the sequence numbers, virtual two-dimensional objects are obtained. The sum of G(β)VWP with the sequence numbers is sigmaG(β)VWPSNg(k) and matches the quantity of all items G(β) existing in the supermarket shop. Here, β indicates the types of items, such as apple and pear.

Before arranging items G(β) on shelves, in cases, or on floors (hereinafter, referred to as "POSCF") of the shop, each item G(β) is scanned by 3DSg, is wrapped with G(β)VWP, and is assigned a sequence number. As a result, all the items are represented by sigmaG(β)VWP(x)SNg(k).

POSCF exists in the fixed real space and therefore has a unique (shop)VM(1)SNg(k).

For example, β is apple, and x apples each wrapped with G(apple)VWP are arranged together at POSCF. Here, x is a positive number. G(apple), G(pear), and G(persimmon) may be arranged all together.

The sequence numbers for G(apple)VWP(k) satisfy the following expression (α).

$$G(\text{apple})VWPSNg(1)+G(\text{apple})VWPSNg(2)+\ldots+G(\text{apple})VWPSNg(m-1)+G(\text{apple})VWPSNg(m) \quad (\alpha)$$

The above expression (α) is represented by sigmaG(apple)VWPSNg(x). Here, x is a positive number.

For management, all items in the supermarket shop are assigned sequence numbers. When the first SQ is set to 1, the following expression is obtained.

$$\text{sigma}G(\text{apple})VWPSNg(x)+\text{sigma}G(\text{pear})VWPSNg(x)+\ldots+\text{sigma}G(\text{milk pack})VWPSNg(x)+\ldots+\text{sigma}G(\text{can of beer})VWPSNg(x)+\ldots+\text{sigma}G(\text{bread})VWPSNg(x)\ldots$$

Since VWPSNg(x)=sigma[sigmaG(β)VWPSNg(x)], the last SQ is a positive number satisfying sigma[sigmaG(β)VWPSNg(x)].

When an item G(β) is arranged at any POSCF, G(β)VWP(x)SNg(k) @ sigma(shop)VM(n)SNg(k) is always satisfied. Therefore, there are a plurality of SQs satisfying G(β)VWP(x)SNg(k)=(shop)VM(n)SNg(k). By combining these SQs, all items G(β) in the shop in the real space each have a stock management SQ.

The following describes the disclosed system in more detail.

FIG. 1 is a view for describing a management system according to one embodiment.

The management system 100 of the embodiment includes a management apparatus 1, a shop 2, a camera 3, a reader 4, and a register 5.

The management apparatus 1 manages, as stocks, items displayed in the shop 2. The location of the management apparatus 1 is not limited to any place.

The shop 2 is a supermarket, for example, and displays items including food, household goods, and others.

At least one camera 3 is installed in the shop 2 and captures images of displayed items and sends the captured images (still images, moving images) to the management apparatus 1 via a communication means (by wired or wireless link).

The reader 4 is installed at the entrance of the shop. The reader 4 reads information identifying visitors from IC cards, mobile terminals, and the like of the visitors and send the information to the management apparatus 1.

The register 5 is installed close to the exit of the shop. The register 5 is used for processing payment for the items the visitors would like to purchase. In addition, the register 5 reads information identifying the visitors from IC cards, mobile terminals, and others of the visitors and sends the information to the management apparatus 1.

Figure 2:
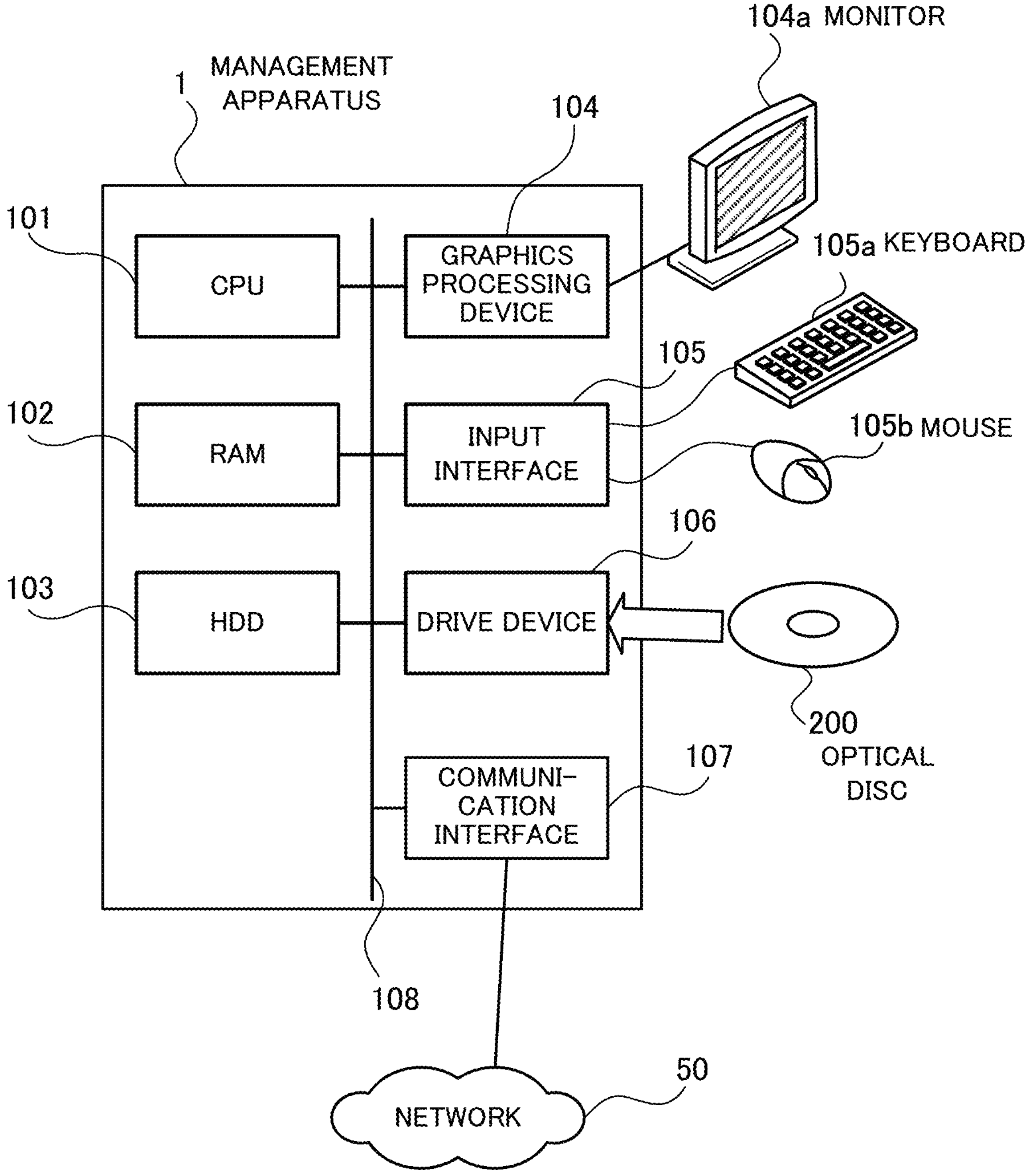
FIG. 2 is a view illustrating a hardware configuration of a management apparatus according to the embodiment.

FIG. 2 illustrates a hardware configuration of the management apparatus according to the embodiment.

The management apparatus (computer) 1 is entirely controlled by a central processing unit (CPU) 101. A random access memory (RAM) 102 and a plurality of peripheral devices are connected to the CPU 101 via a bus 108.

The RAM 102 is used as a main memory of the management apparatus 1. The RAM 102 temporarily stores therein at least part of operating system (OS) programs and application programs that are executed by the CPU 101. In addition, the RAM 102 stores therein various kinds of data to be used by the CPU 101 in processing.

Connected to the bus 108 are a hard disk drive (HDD) 103, a graphics processing device 104, an input interface 105, a drive device 106, and a communication interface 107.

The HDD 103 magnetically reads and writes data from and to a built-in disk. The HDD 103 is used as a secondary storage device of the management apparatus 1. The HDD 103 stores therein OS programs, application programs, and various kinds of data. In this connection, a semiconductor memory device such as a flash memory may be used as the secondary storage device.

A monitor 104*a* is connected to the graphics processing device 104. The graphics processing device 104 displays images on the screen of the monitor 104*a* in accordance with commands from the CPU 101. Examples of the monitor 104*a* include cathode ray tube (CRT) displays, liquid crystal displays, and others.

A keyboard 105*a* and a mouse 105*b* are connected to the input interface 105. The input interface 105 gives signals received from the keyboard 105*a* and mouse 105*b* to the CPU 101. In this connection, the mouse 105*b* is one example of a pointing device and another pointing device may be used. Other pointing devices include touch panels, tablets, touch pads, track balls, and others, for example.

The drive device 106 reads data from a portable storage medium such as an optical disk, in which data is recorded so as to be readable with reflection of light, or a universal serial bus (USB) memory, for example. In the case where the drive device 106 is an optical drive device, for example, data is read from an optical disc 200 with laser light or the like. Examples of the optical disc 200 include Blu-ray (registered trademark), digital versatile disc (DVD), DVD-RAM, compact disc read only memory (CD-ROM), compact disc recordable (CD-R), and compact disc rewritable (CD-RW).

The communication interface 107 is connected to a network 50. The communication interface 107 communicates data with other computers and communication devices over the network 50.

With the above hardware configuration, the processing functions of the present embodiment are implemented.

Figure 3:
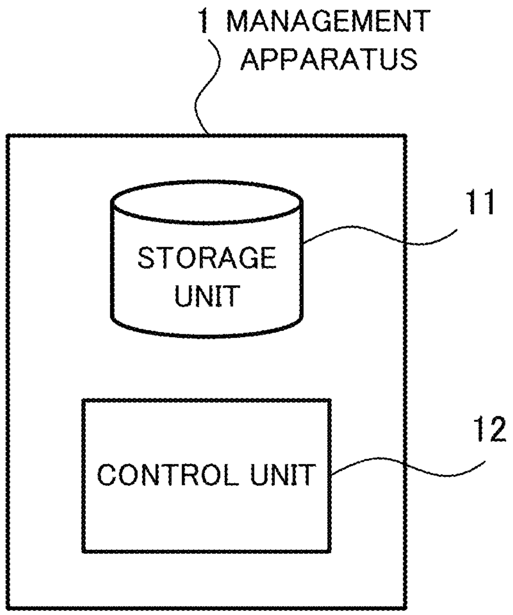
FIG. 3 is a block diagram illustrating functions of the management apparatus according to the embodiment.

FIG. 3 is a block diagram illustrating functions of the management apparatus according to the embodiment.

The management apparatus 1 includes a storage unit 11 and a control unit 12.

The storage unit 11 holds a variety of information (various master data and various tables, which will be described later) to be used for managing items as stocks.

The control unit 12 performs the following process.

The control unit 12 repeatedly places (α)VM(n) until the same three-dimensional shape as RLS(α) is obtained, with (n) being arbitrary, so as to create a three-dimensional virtual space.

Then, the control unit 12 assigns each (α)VM(n) a sequence number, and manages them together with their virtual space position coordinates with respect to a base point. Here, the base point is desirably set.

FIG. 4 is a view for describing unit three-dimensional virtual cube master data.

The unit three-dimensional virtual cube master data illustrated in FIG. 4 is a table for managing a created three-dimensional virtual space.

The unit three-dimensional virtual cube master data 51 has fields for unit three-dimensional virtual cube sequence number ((shop)VM(1)SNg in FIG. 4, and this applies hereinafter), size, size unit, and virtual space position coordinates. These information pieces are associated with each other.

The (shop)VM(1)SNg field contains information identifying one unit obtained by virtually dividing the three-dimensional space of the shop. In the present embodiment, the three-dimensional space is defined in units of 1 $mm^3$. For example, ((shop)VM(1)SNg) of "A0001" on the first row and ((shop)VM(1)SNg) of "A0002" on the second row indicate cubes of 1 $mm^3$ located next to each other on the X axis.

In addition, the three-dimensional virtual space of the present embodiment has the following rules.

(Rule 1) A base point is fixed in the system, irrespective of whether the space is a static virtual space or a dynamic virtual space. For example, in the solar system, the earth revolves and rotates, and therefore needs to be processed in a dynamic virtual space. However, even using a static virtual space or a dynamic virtual space, RLS(α) as the base point is considered as the same space, and therefore both cases have the same number of SNg(k).

(Rule 2) The (n) value may be changed according to a, so that the size of (α)VM(n) may desirably be enlarged or shrunk. In this case, (α)VM(n) is defined in the system.

(Rule 3) A mixture of different unit three-dimensional virtual cubes in the same a is prohibited because some virtual spaces may fall out of management.

(Rule 4) In the case where a is the earth, the distance between the base point and (α)VM(n) may be changed due to an earthquake or the like. If this happens, (α)VM(n) is created again, and new sequence numbers are assigned to new (α)VM(n) after the rearrangement. In this connection, a history about previous x rearrangements is recorded so as to allow tracking the history (x is an arbitrary number).

The following describes a concrete example of a stock management method in a shop in a real space. For example, the stock management method is classified into the following processes: (1) warehoused item sequencing process, (2) virtual wrapping (VWP) process, (3) display place management and stock registration process, and (4) visitor management process. The following describes these processes in order.

(1) Warehoused item sequencing process

When items (hereinafter, referred to as G(β)) are warehoused, the control unit 12 assigns sequence numbers to them with reference to item master data registered in advance, and registers this information in a warehousing information management table (warehousing process).

FIG. 5 is a view for describing the item master data.

The item master data 52 has fields for item code, item name, package flag, item size, size unit, and pack code. These information pieces are associated with each other.

The item code field contains a number identifying an item.

The item name field contains a name identifying the item.

The package flag field contains a value indicating whether the item is packed. A value of "1" indicates that the item is packed, whereas a value of "0" indicates that the item is not packed.

The item size field contains the size of the item occupying the space.

The size unit field contains the units of item size. The size of the item occupying the space is determined by the item size and size unit.

The pack code field contains a pack code registered in pack master data, which will be described below.

FIG. 6 is a view for describing the pack master data.

The pack master data 53 has fields for pack code, pack name, and per-pack quantity. These information pieces are associated with each other.

The pack code field contains a code identifying a pack.

The pack name field contains the name of the pack.

The per-pack quantity field contains the number of items corresponding to a pack name registered in the pack name field.

It is confirmed with reference to the item master data 52 and pack master data 53 that twelve items (for example, cans of beer) are contained in one pack with respect to a product A (for example, beer in a pack).

When items are warehoused, the control unit 12 identifies all the items on the basis of information obtained by 3D-scanning the items and performs the warehousing process on the items, irrespective of whether the items are packaged or not (solid or liquid) and whether these are already registered in the item master data 52.

FIG. 7 is a view for describing shopping basket master data.

The shopping basket master data 54 has fields for shopping basket number and shopping basket name.

The shopping basket number field contains a code assigned to a shopping basket.

The shopping basket name field contains a name given to the shopping basket.

FIG. 8 is a view for describing a warehousing information management table.

The warehousing information management table T1 has fields for item sequence number, item code, warehousing group number, item size, quantity, and warehousing date. These information pieces are associated with each other.

The item sequence number field contains an item sequence number assigned to an item. For example, in the case where β is apple, G(apple)SNg1, G(apple)SNg2, . . . , G(apple)SNgm are set. In the case where β is pear, G(pear)SNg1, G(pear)SNg2, . . . , G(pear)SNgm are set.

The item code field contains the item code of the item registered in the item master data 52.

The warehousing group number field contains a count number for the warehousing process performed on the item warehoused from a supplier on a warehousing date. In this connection, a plurality of suppliers may exist, plural kinds of items may exist, and items may be warehoused a plurality of times.

The item size field contains the item size of the item registered in the item master data 52.

The quantity field contains the quantity of the item.

The warehousing date field contains the date of warehousing of the item.

(2) Virtual Wrapping Process

Next, the control unit 12 wraps each item G(β) with G(β)VWP (virtual wrapping sheet), irrespective of whether it is a packaged item or a unpackaged item (solid or liquid), and updates the warehousing information management table T1. Originally, this virtual wrapping process is a process for items such as vegetables and fruits, which are displayed in a shop without being wrapped and to which data information such as a barcode or QR code is not directly attached. Such items are wrapped by transparent sheets to distinguish unpackaged items individually. In this connection, this process may be performed on packaged items without causing any problems, and therefore all items are each wrapped with G(β)VWP and the warehousing information management table T1 is updated.

G(β)VWP is transparent with a thickness of zero in this system, and a sequence number is given to G(β)VWP (hereinafter, referred to as G(β)VMPSNg(k)).

FIG. 9 is a view for describing an updated warehousing information management table.

The updated warehousing information management table T1a has fields for item sequence number, item code, warehousing group number, item size, quantity, warehousing date, and VWP sequence number. These information pieces are associated with each other.

The VWP sequence number field contains a number identifying a VWP sequence number.

(3) Display Place Management and Stock Registration Process

By placing unit three-dimensional virtual cubes (α)VM(n) to imitate a real space that is a shop, the shop is fully filled with the virtual cubes with sequence numbers.

Since α=shop, the sum of sequence numbers (shop)VM(1)SNg(k) is represented by Σ(shop)VM(1)SNg(k).

Each displayed item is captured by a camera or the like. The control unit 12 determines a reference position of the three-dimensional virtual space on the basis of the captured information, and links unit three-dimensional virtual cube sequence numbers ((shop)VM(1)SNg(k)) and the sequence number of an item to each other and registers them as stock information.

The control unit 12 registers G(β)VWPSNg as a stock sequence number and uses this G(β)VWPSNg as a sequence number for visitor management, which is to be executed later.

When stock information is registered, G(β)VWP(x)SNg(k) @ sigma(shop)VM(n)SNg(k) is always satisfied.

FIG. 10 is a view for describing a stock information management table.

The stock information management table T2 has fields for stock sequence number, item sequence number, item code, (shop)VM(1)SNg, warehousing date, pack code, VWP sequence, delivery date, and delivery flag. These information pieces are associated with each other.

The stock sequence number field contains information obtained by assigning VWP to an item sequence number.

The (shop)VM(1)SNg field contains (shop)VM(1)SNg that an item assigned the stock sequence number occupies. For example, it is confirmed that the coordinates of an item with an item sequence number G(product A)SNg1 listed on the first row in the virtual space are "10, 10, 0," "11, 10, 0," . . . .

The delivery date field contains the delivery date of the item.

The delivery flag field contains a flag indicating the presence or absence of delivery. A flag of "1" indicates that the item has been delivered, whereas a flag of "0" indicates that the item has not been delivered.

As to Display Place Management (1) The control unit 12 assigns display place sequence numbers to floors and shelves used for display.

(2) In the case where the display place is a floor, the control unit 12 determines a base point and an end point and defines three-dimensional (a·b·c) $m^3$ for the floor used for display. As the height of the floor that is used as the display place, the height of a unit three-dimensional virtual cube sequence number ((shop)VM(1)SNg(k)) is set.

(3) In the case where the display place is a shelf, the control unit 12 defines the size thereof and registers the shelf size.

(4) A display place type is used to indicate whether a display place sequence number is for a floor or a shelf.

(5) In the case where the display place is a floor, the control unit 12 sets the base point and the end point, and links unit three-dimensional virtual cube sequence numbers (shop)VM(1)SNg(k) within a range defined by the base point and the end point to a display place sequence number.

(6) In the case where the display place is a shelf, the control unit 12 determines a reference position using a camera or the like, in the same manner as done for items, and links unit three-dimensional virtual cube sequence numbers (shop)VM(1)SNg(k) to a display place sequence number.

This linking makes it possible to determine at which display place an item is displayed in the following manner.

With (shop)VM(1)SNg(k) corresponding to a stock sequence number, (shop)VM(1)SNg(k) corresponding to display place sequence numbers are searched.

In the case where the display place is a floor, and the same (shop)VM(1)SNg(k) is shared or adjacent (shop)VM(1)SNg (k) is registered, it is possible to confirm on which floor the item are displayed.

In the case where the display place is a shelf, the same (shop)VM(1)SNg(k) is shared, and it is therefore possible to confirm on which shelf the item is displayed.

In addition, it is possible to confirm, from the positional information of (shop)VM(1)SNg(k), the shelf number of a shelf on which the item is displayed.

FIG. 11 is a view for describing a display place management table.

The display place management table T3 has fields for display place sequence number, display place type, (shop) VM(1)SNg, and display type size. These information pieces are associated with each other.

The display place sequence number field contains a display place sequence number assigned by the control unit 12.

The display place type field contains the type of a place where items are displayed.

The (shop)VM(1)SNg field contains (shop)VM(1)SNg assigned by the control unit 12 to the place registered in the display place type field.

The display type size field contains the size of the display type.

(4) Visitor Management Process

(4-1) Process when Visitor Enters Shop

The control unit 12 assigns a unique sequence number to a visitor entering the shop and stores this information in the storage unit 11. For example, the number assignment method is that the reader 4 installed at an entrance reads unique identification information (visitor identification information) from an IC card, mobile terminal, or the like of a visitor. The reader 4 sends the read unique identification information and the date and time of the reading of the identification information to the management apparatus 1. The control unit 12 is able to use the visitor identification information received by the management apparatus 1.

FIG. 12 is a view for describing a visitor information management table.

The visitor information management table T4 has fields for visitor sequence number, identification classification, visitor identification information, entry date and time, shopping basket number, and exit date and time. These information pieces are associated with each other.

The visitor sequence number field contains a sequence number assigned by the control unit 12.

The identification classification field indicates a device held by a visitor.

The visitor identification information field contains the visitor identification information of the visitor read by the reader 4.

The shopping basket number field contains a shopping basket number assigned to a shopping basket given to the visitor at the entrance. In this connection, the shopping basket number of a shopping basket the visitor picks may be confirmed by the reader 4, which then may send the shopping basket number to the management apparatus 1.

The entry date and time field contains the date and time when the reader 4 reads the visitor identification information.

The exit date and time field contains the date and time of completion of checkout.

(4-2) Process Performed when Visitor Takes Item

The camera 3 is used to monitor the inside of the shop. When a visitor takes an item (when the item is taken out of its displayed place), the stock sequence number of the taken item is determined using the image processing or the like of the camera 3. A sensor is attached to a shopping basket. When the item is put in the basket, the stock sequence number of the item taken immediately before and the visitor sequence number linked to the shopping basket are linked to each other.

The control unit 12 records the stock sequence number corresponding to the place of the taken item in take-out information.

FIG. 13 is a view for describing a take-out information management table.

In the present embodiment, the take-out information management table is provided for each visitor.

The take-out information management table T5 has fields for visitor sequence number, stock sequence number, and processing flag. These information pieces are associated with each other.

The processing flag field contains a flag indicating whether payment is complete. A value of “0” indicates that payment is not yet complete, whereas a value of “1” indicates that payment is complete.

The take-out information management table T5 of FIG. 13 includes take-out information indicating that a visitor T0001 has taken two apples and one pear and take-out information indicating that a visitor T0002 has taken one pear and one product.

(4-3) Process at Checkout

When a visitor makes checkout, the register 5 reads the visitor identification information from an IC card, mobile terminal, or the like of the visitor and sends it to the management apparatus 1. Then, for example, the visitor makes payment for the items the visitor has taken, using barcodes or the like, for example. The control unit 12 checks whether the payment for the items the visitor has taken is correctly processed by the register 5.

More specifically, stock sequence numbers are included in barcodes or the like. The control unit 12 sets a processing flag to "1" for items that have been processed in the checkout, in the take-out information management table T5. If there is any item with a processing flag of "0" even after the checkout process is completed, for example, the control unit 12 reports an alert in case of a possible illegal act. Any desired method may be employed for the alert. For example, the alert may be displayed on the display of the register 5 or may be displayed on the monitor 104*a* connected to the management apparatus 1.

The control unit 12 refers to the stock information management table T2 when the checkout is completed, and registers a delivery flag and a delivery date in the stock information.

FIG. 14 is a view for describing an updated stock information management table.

The updated stock information management table T2a has set a delivery date in the delivery date field and a delivery flag to "1" for each item whose payment is complete.

The following describes (4-2) the process performed when visitor takes item and (4-3) the process at checkout, with reference to flowcharts. The following processes are just an example, and a means to create the above-described tables T1 to T5 is not limited to the processes of the following flowcharts.

Figure 15:
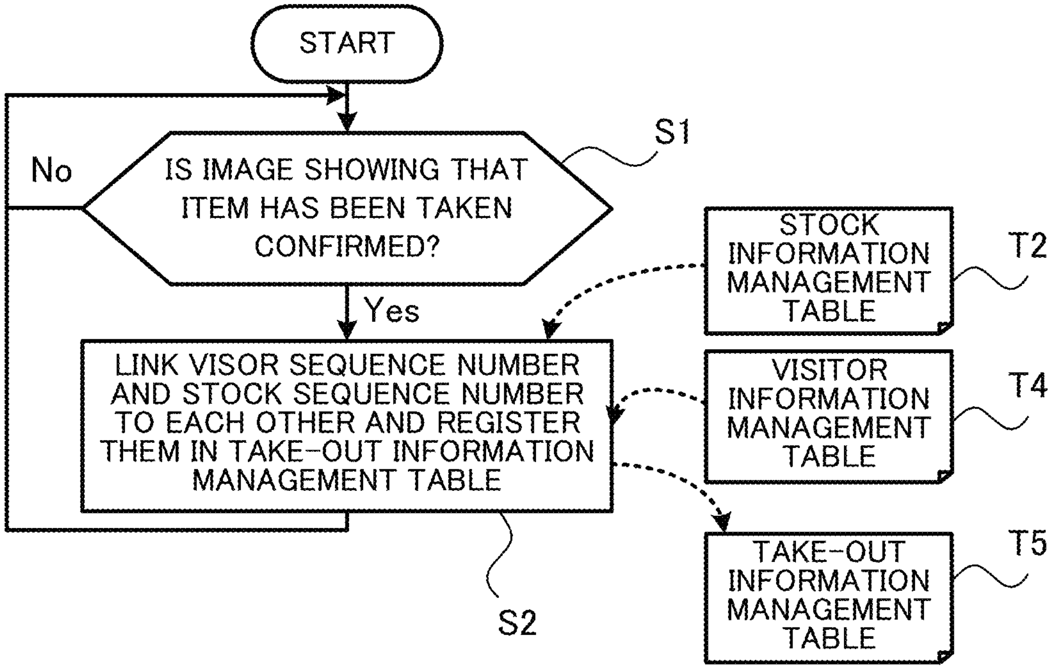
FIG. 15 is a view for describing a process performed when a visitor takes an item.

FIG. 15 is a view for describing a process performed when a visitor takes an item.

(Step S1) The control unit 12 performs an image recognition process on images sent from the camera 3 using an AI or the like, and determines whether an image showing that a visitor has taken an item is confirmed. If it is confirmed from the image that a visitor has taken an item (Yes in step S1), the process proceeds to step S2. If it is not confirmed from the image that a visitor has taken an item (No in step S2), step S1 is repeated.

(Step S2) The control unit 12 specifies a visitor sequence number linked to the shopping basket number of a shopping basket in which the item taken immediately before is put, with reference to the visitor information management table T4. Then, the control unit 12 associates the stock sequence number (shop)VM(1)SNg of the taken item with the specified visitor sequence number with reference to the stock information management table T2 to create the take-out information management table T5. The process proceeds back to step S1 to repeat the process from step S1.

Figure 16:
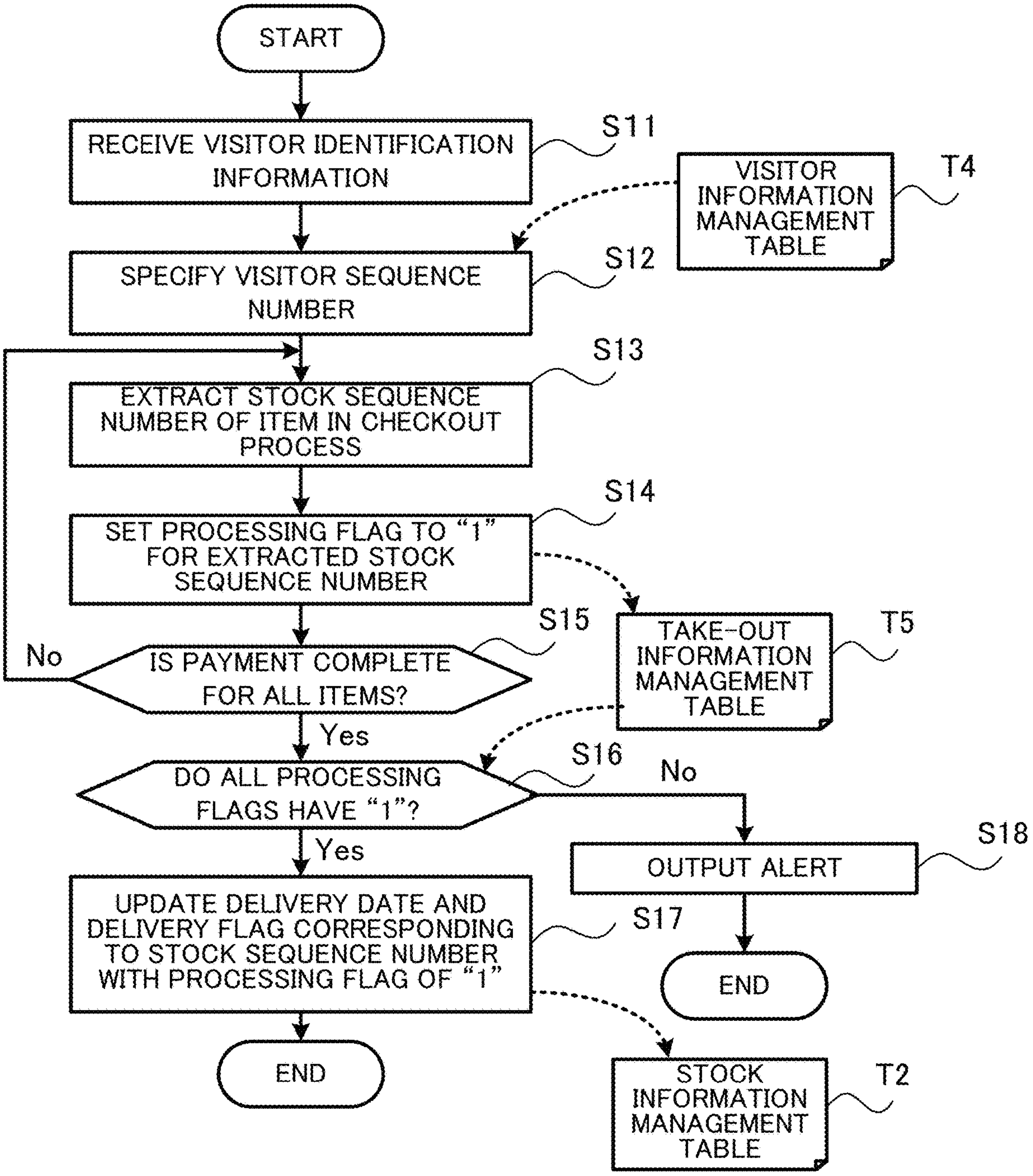
FIG. 16 is a flowchart for describing a process at checkout.

FIG. 16 is a flowchart for describing a process at checkout.

(S11) The control unit 12 receives visitor identification information sent from the register 5 or the like. Then, the process proceeds to step S12.

(Step S12) The control unit 12 specifies a visitor sequence number corresponding to the visitor identification information received at step S11 with reference to the visitor information management table T4. Then, the process proceeds to step S13.

(Step S13) The control unit 12 extracts the stock sequence number of an item in the checkout process. Then the process proceeds to step S14.

(Step S14) The control unit 12 sets a processing flag to "1" for a stock sequence number matching the stock sequence number extracted at step S13, in the take-out information management table T5. Then, the process proceeds to step S15.

(Step S15) The control unit 12 determines whether information indicating that the payment is complete for all items has been received from the register 5. If information indicating the payment is complete for all items has not been received from the register 5 (No at step S15), the process proceeds to step S13 to repeat the process from step S13. If information indicating that the payment is complete for all items has been received from the register 5 (Yes at step S15), the process proceeds to step S16.

(Step S16) The control unit 12 determines with reference to the take-out information management table T5 whether all processing flags have a value of "1." If all the processing flags have a value of "1" (Yes at step S16), the process proceeds to step S17. If any processing flag does not have a value of "1" (No at step S16), the process proceeds to step S18.

(Step S17) The control unit 12 sets delivery date and time as the delivery date for the stock sequence numbers corresponding to the processing flag of "1" in the stock information management table T2. In addition, the control unit 12 sets a delivery flag to "1." Then, the process of FIG. 16 is completed.

(Step S18) The control unit 12 reports an alert. Then, the process of FIG. 16 is completed.

As described above, with the management apparatus 1, the control unit 12 divides a predetermined space (shop in the present embodiment) into units previously set in the unit three-dimensional virtual cube master data 51, sets relative position coordinates (unit three-dimensional virtual cubes), issues numbers (unit three-dimensional virtual cube sequence numbers) identifying the set position coordinates, and creates the stock information management table that associates position coordinates ((shop)VM(1)SNg), identification information (item sequence number) of an item existing at the position coordinates, and the presence or absence (delivery flag) of movement of the item with each other. Therefore, it is achieved to manage stocks using the virtual space. In this connection, the present embodiment exemplifies warehousing and delivery as the presence or absence of movement of an object, but the configuration is not limited thereto.

Further, when an item no longer exists at the position coordinates of the item after a visitor takes the item, the control unit 12 creates the take-out information management table T5 associating the visitor that has taken and held the item and the identification information (item sequence number) of the item with each other. This makes it possible to track the movement of the taken object.

Still further, when the visitor stands at a predetermined position (a checkout position in the present embodiment), the control unit 12 checks the stock sequence numbers of items for which the checkout process is done against the stock sequence numbers registered in the take-out information management table T5 to detect a match, in order to thereby determine whether the visitor has performed a predetermined process (checkout process) for the items the visitor has taken. This makes it easy to detect, for example, that an item is going to be stolen away.

Still further, when the visitor has performed the checkout process for the items the visitor has taken, the stock information management table T2 is updated to indicate that the items no longer exist at the position coefficients of the items. This makes it easy to perform the stock management.

In this connection, the process performed by the management apparatus 1 may be performed by a plurality of devices in a distributed manner. For example, one device may be designed to create the stock information management table T2, and another device may be designed to perform a visitor management process using the created stock information management table T2.

Heretofore, the management apparatus and management method have been described with respect to the embodiment illustrated. The configuration is not limited thereto, and the components of each unit may be replaced with other components having equivalent functions. In addition, other desired configurations and steps may be added to the embodiment.

In addition, desired two or more configurations (features) in the above-described embodiment may be combined.

The above-described processing functions may be implemented by using a computer. In this case, a program is prepared, which describes processes for the functions of the management apparatus 1. A computer implements the above-described processing functions by executing the program. The program describing the intended processes may be stored on a computer-readable storage medium. Computer-readable storage media include magnetic storage devices, optical discs, magneto-optical storage media, semiconductor memories, and others. The magnetic storage devices include hard disk drives, flexible disks (FDs), magnetic tapes, and others. The optical discs include DVDs, DVD-RAMs, CD-ROMs, CD-RWs, and others. The magneto-optical storage media include magneto-optical disks (MOs) and others.

To distribute the program, portable storage media, such as DVDs and CD-ROMs, on which the program is stored, may be put on sale, for example. Alternatively, the program may be stored in a storage device of a server computer and may be transferred from the server computer to other computers over a network.

A computer which is to execute the above program stores in its local storage device the program recorded on a portable storage medium or transferred from the server computer, for example. Then, the computer reads the program from the local storage device and runs the program. The computer may run the program directly from the portable storage medium. Also, while receiving the program being transferred from the server computer over a network, the computer may sequentially run this program.

In addition, the above-described processing functions may also be implemented wholly or partly by using a digital signal processor (DSP), an application specific integrated circuit (ASIC), a programmable logic device (PLD), or other electronic circuits.

According to one aspect, it is achieved to manage stocks using a virtual space.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

The invention claimed is:

1. A management apparatus comprising:

a processor configured to perform a procedure including, assigning unique sequence numbers respectively to objects existing in a real space, wherein the objects are non-human store inventory for sale, setting relative position coordinates for each unit three-dimensional virtual cube of a virtual space formed by dividing the real space by preset units, issuing numbers identifying the position coordinates of the unit three-dimensional virtual cubes, based on information obtained by capturing an image of an individual object arranged in the real space, determining a number identifying position coordinates of the unit three-dimensional virtual cubes indicating a place of the individual object in the virtual space, calculating a range of the unit three-dimensional virtual cubes occupied by the object by dividing a size of the object by the preset units of the unit three-dimensional virtual cube, and registering first information linking range information of the unit three-dimensional virtual cube sequence numbers that the object occupies and a sequence number of the object to each other, registering second information indicating whether movement of the object out of the real space has been performed, and updating, upon detecting that the movement of the object has been performed, the second information corresponding to the sequence number of the object so as to indicate that the movement of the object has been performed; and a memory coupled to the processor and configured to hold the first information and the second information.

2. The management apparatus according to claim 1, wherein the procedure further includes generating, upon detecting that the object no longer exists at the position coordinates of the object, holder information associating a holder holding the object, which no longer exists at the position coordinates of the object, and identification information of the object with each other.

3. The management apparatus according to claim 2, wherein the procedure further includes comparing the identification information of the object registered in the holder information with identification information of the object presented by the holder and determining whether the process of permitting the movement of the object held by the holder out of the virtual space has been performed.

4. The management apparatus of claim 1, wherein the second information is generated based on detecting absence of the image of the object at the position coordinates.

5. The management apparatus of claim 4, wherein the processor is further configured to, associate the sequence number of the object with a visitor sequence number for a visitor performing the movement of the object.

6. The management apparatus of claim 5, wherein the processor is further configured to, determine whether payment for the object has been completed by the associated visitor, and if payment has been completed, update a stock table in the memory with a date of the completion and a flag indicating the object is out of stock.

7. A management method comprising:

assigning, by a computer, unique sequence numbers respectively to objects existing in a real space, wherein the objects are non-human store inventory for sale;

setting, by the computer, relative position coordinates for each unit three-dimensional virtual cube of a virtual space formed by dividing the real space by preset units, issuing, by the computer, numbers identifying the position coordinates of the unit three-dimensional virtual cubes, based on information obtained by capturing an image of an individual object arranged in the real space, determining, by the computer, a number identifying position coordinates of the unit three-dimensional virtual cubes indicating a place of the individual object in the virtual space, calculating a range of the unit three-dimensional virtual cubes occupied by the objectby dividing a size of the object by the presetunits of the unit three-dimensional virtual cube, and registering first information linking range information of the unit three-dimensional virtual cube sequence numbers that the object occupies and a sequence number of the object to each other, registering, by the computer, second information indicating whether movement of the object out of the real space has been performed; and updating, by the computer, upon detecting that the movement of the object has been performed, the second information corresponding to the sequence number of the object so as to indicate that the movement of the object has been performed.

8. The method of claim 7, wherein the second information is generated based on the detecting absence of the image of the object at the position coordinates.

9. The method of claim 8, further comprising:

associating, by the computer, the sequence number of the object with a visitor sequence number for a visitor performing the movement of the object.

10. The method of claim 9, further comprising:

determining, by the computer, whether payment for the object has been completed by the associated visitor, and if payment has been completed, updating a stock table with a date of the completion and a flag indicating the object is out of stock.

11. A non-transitory computer-readable storage medium storing therein a computer program that causes a computer to perform a procedure comprising:

assigning unique sequence numbers respectively to objects existing in a real space, wherein the objects are non-human store inventory for sale;

setting relative position coordinates for each unit three-dimensional virtual cube of a virtual space formed by dividing the real space by preset units;

issuing numbers identifying the position coordinates of the unit three-dimensional virtual cubes;

based on information obtained by capturing an image of an individual object arranged in the real space, determining a number identifying position coordinates of the unit three-dimensional virtual cubes indicating a place of the individual object in the virtual space, calculating a range of the unit three-dimensional virtual cubes occupied by the object by dividing a size of the object by the preset units of the unit three-dimensional virtual cube, and registering first information linking range information of the unit three-dimensional virtual cube sequence numbers that the object occupies and a sequence number of the object to each other;

registering second information indicating whether movement of the object out of the real space has been performed; and updating, upon detecting the movement of the object has been performed, the second information corresponding to the sequence number of the object so as to indicate that the movement of the object has been performed.

12. The medium of claim 11, wherein the second information is generated based on detecting absence of the image of the object at the position coordinates.

13. The medium of claim 12, wherein the procedure further comprises:

associating the sequence number of the object with a visitor sequence number for a visitor performing the movement of the object.

14. The method of claim 13, wherein the procedure further comprises:

determining whether payment for the object has been completed by the associated visitor, and if payment has been completed, updating a stock table with a date of the completion and a flag indicating the object is out of stock.

* * * * *